Oct. 15, 1935.  A. NUTSFORD  2,017,183
INDICATING MECHANISM FOR MEASURING INSTRUMENTS
Filed Aug. 10, 1934
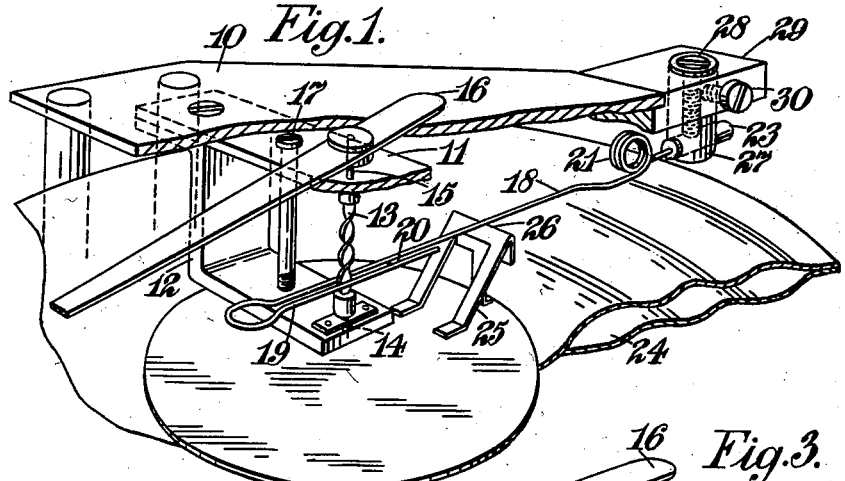
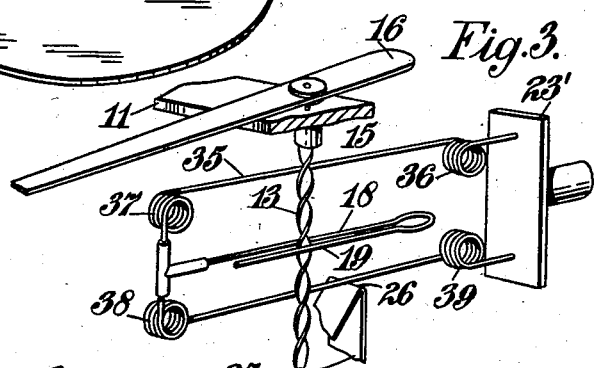
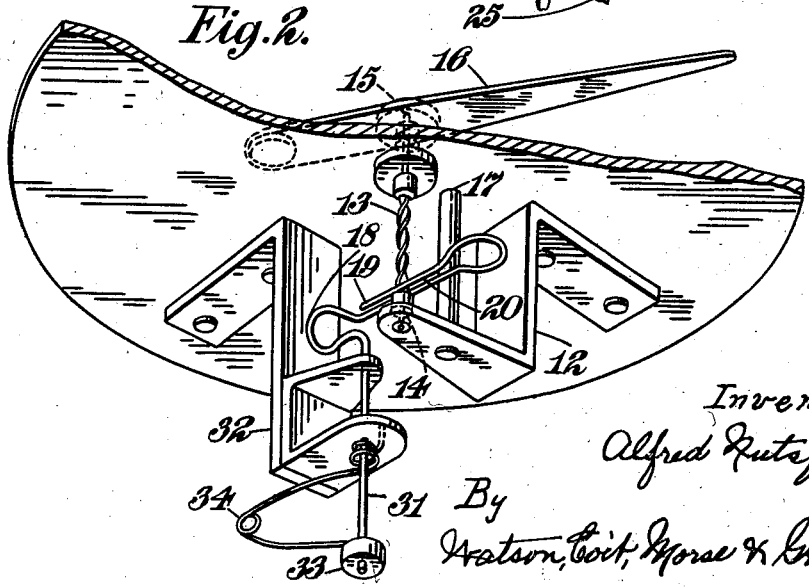
Inventor
Alfred Nutsford
By
Watson, Coit, Morse & Grindle
Attorneys.

Patented Oct. 15, 1935

2,017,183

UNITED STATES PATENT OFFICE 2,017,183

INDICATING MECHANISM FOR MEASURING INSTRUMENTS

Alfred Nutsford, Farnborough, England, assignor to S. Smith & Sons (Motor Accessories) Limited, London, England Application August 10, 1934, Serial No. 739,336
In Great Britain August 14, 1933

10 Claims. (Cl. 73—4)

This invention relates to the mechanism employed for connecting an indicating pointer to a primary operating unit of an instrument such as a pressure gauge, an air speed indicator, a thermometer or the like. The principal object of the present invention is to provide a more simple and reliable mechanism of this class.

Another object of this invention is to provide a mechanism of this class in which a backlash spring need not be employed to prevent backlash between the primary operating unit and the indicating pointer.

A further object of this invention is to provide a mechanism of the above class in which a separate return spring need not be employed for returning the pointer to its zero position.

Yet a further object of this invention is to provide mechanism of the class specified which allows of a large movement, for example, two revolutions, of the pointer.

In accordance with this invention, the pointer of an instrument of the above class is connected to the primary operating unit by means of a rotatable screw which is secured to the pointer and which may be formed by twisting a flat strip into a helix and a lever which is formed with a resilient forked portion embracing the screw without clearance, so that no backlash can occur between these parts, and mounted to move in a plane containing the axis of the screw. This lever is acted on directly by the primary operating unit of the instrument so as to be moved thereby. As the forked portion moves along the axis of the screw, the latter is rotated together with the pointer.

It is a feature of this invention to form the forked portion of the lever by bending the latter back parallel to itself. The lever may be secured at its end remote from the forked portion and coiled into a helix adjacent its fixed end. The helical portion of the lever acts as a pivot about which the lever rocks and also as a return spring. The lever may, however, be mounted to move bodily parallel to the axis of the screw.

Other objects and advantages of the present invention will be clear from the following description of three specific examples with reference to the accompanying drawing, in which—

Figure 1 is a diagrammatic perspective view of a part of a barometric instrument embodying one form of the present invention. In this view the parts have been broken away in order to show the construction.

Figure 2 is a similar view of a modified form of mechanism according to this invention, and Figure 3 is a similar view of a third construction according to the invention.

Like reference characters indicate like parts in all figures of the drawing.

Referring to Figure 1, the instrument comprises a base 10 which carries a pair of brackets 11 and 12. A screw 13 is supported in suitable bearings in these brackets by means of spindles 14 and 15. A pointer 16 is secured on the spindle 15 so as to rotate with the screw 13. The screw 13 is formed by twisting a flat metal strip into a helix. The screw 13 can rotate but is restrained from axial movement by the brackets 11 and 12. These two brackets can be drawn together by means of a screw 17 extending between them so as to take up any backlash which the screw 13 may have in a vertical direction.

A resilient rod 18 is bent back on itself at 19 to form a forked portion. The width of the slot 20 between the portion 19 and the main portion of the rod 18 is slightly less than the thickness of the strip on which the screw 13 is formed. The screw 13 passes through the slot 20 and is gripped lightly between the portion 19 and the main portion of the rod 18. There will thus be no backlash between the rod 18 and the screw 13.

The rod 18 is coiled in a helix at 21 and its end is secured in a fixed block 23. The helix 21 allows the rod 18 to rock in a plane containing the axis of the screw 13 and also acts as a return spring to restore the rod 18 to its lowermost position at the bottom of the screw 13.

The primary operating unit of the instrument, which, in the instrument shown in Figure 1, is a barometric capsule 24, carries a metal bracket 25 which is bent as shown to provide a knife-edge 26 engaging the rod 18. Expansion or contraction of the capsule moves the knife-edge 26 so as to rock the rod 18 about the helix 21 and thereby cause the slot 20 to travel along the axis of the screw 13. The screw 13 is thus rotated and rotates the pointer 3.

It will be observed that with this arrangement, there is no backlash in the mechanism connecting the pointer to the primary operating unit and no backlash spring need be provided. Further, no return spring need be provided since the coiled portion 21 of the rod acts as a return spring. It is thus possible to arrange the instrument so that the pointer has an unusually large movement, for example, a movement of two or more revolutions. As shown in Figure 1 the screw 13 is formed by twisting the flat strip through two revolutions so that the screw 13 and the pointer 16 will turn through two revolutions, while the lever 18 is travelling from the bottom to the top of the screw.

The linear magnification afforded by the mechanism can be varied by adjusting the position of the knife-edge 26 along the length of the rod 18 which acts as a lever. The adjustment of the position of the knife-edge can be effected by deforming the bracket 25.

Provision may be made for adjusting the anchorage of the rod 18 both in order to vary the magnification and in order to align this rod. For this purpose the block 23 extends through a hole in a member 27 so that it can be slid relatively to that member. The block 23 is locked in position relatively to the member 27 by a screw 28. The member 27 extends through a suitable hole in a fixed part 29 and can be locked in position relatively to the part 29 by means of a screw 30. This provides a universal mounting by which the position of the rod 18 can be properly set.

The arrangement shown in Figure 2 is designed to give a linear magnification of unity. The arrangement of the pointer and screw is as previously explained and need not be repeated. The rod 18 is bent back at 19 to embrace the screw 13 as previously explained but instead of being straight is bent through 90° so as to have a portion 31 extending at right angles to the length of the forked portion and parallel to the axis of the screw 13. The part 31 is mounted to slide in a suitable bracket 32 and has a collar 33 fixed to its end. A return spring is engaged with the collar 33 and the bracket 32 and tends to move the rod 18 in one direction and the slot 20 to one end of the screw 13. The primary operating unit (not shown in Figure 2) engages the collar 33 so as to move the rod 18 bodily parallel to the axis of the screw 13. The manner in which this mechanism operates will be obvious from the description previously given. It should be noted that the rod 18 is self-aligning in respect to the screw 13 in the arrangement shown in Figure 2.

In the arrangement shown in Figure 3, the forked portion 18, 19, is given a parallel motion so that it is always normal to the axis of the screw 13. This renders it possible to arrange the knife-edge 26 close to the axis of the screw. In this arrangement the forked part 18, 19, is secured integrally on the mid portion of a resilient rod 35 which is coiled at 36, 37, 38, and 39 into the helices and is also bent at 37 and 38 to have two equal parallel portions joined by a third portion to which the forked part 18, 19, is secured. The rod 35 flexes at the helices and acts as a parallel motion linkage. The ends of the rod 35 are secured to a suitable member 23' which may be adjustably mounted in the same way as the block 23 in Figure 1.

It should be noted that the forked part of the rod 18 exerts a constant force on the screw 13 irrespective of the position of the parts. This force serves to prevent backlash. In conventional instruments backlash is prevented by a coiled spring which exerts a progressively increasing or decreasing force on the parts of the mechanism and thus progressively increases or decreases the friction in the mechanism. The employment of a coiled spring also renders it difficult to obtain a range of travel of the pointer exceeding one revolution.

It will be understood that various omissions and substitutions and changes in the form and details of the devices illustrated may be made by those skilled in the art without departing from the spirit of the invention. It is the intention therefore to be limited only as indicated by the scope of the following claims.

I claim—

1. Indicating mechanism for measuring instruments comprising a rotatable pointer, a quick-thread screw secured to the pointer to rotate therewith and a lever which is mounted to move in a plane containing the axis of the screw and is formed with a springy forked portion nipping the screw between its threads.

2. Indicating mechanism for measuring instruments comprising a rotatable pointer, a quick-thread screw secured to the pointer to rotate therewith, and a flexible rod extending transversely of the axis of the screw, fixed at one end and bent parallel to itself at its other end to form a resilient forked portion embracing the screw between its threads without clearance.

3. Indicating mechanism for measuring instruments comprising a rotatable pointer, a quick-thread screw secured to the pointer to rotate therewith and a resilient rod extending transversely of the axis of the screw, fixed at one end, coiled adjacent to said end into a helix and bent at its other end back parallel to itself to form a forked portion embracing the screw between its threads without clearance.

4. Indicating mechanism for measuring instruments comprising a screw formed by twisting a strip into a helix, a pointer secured to the screw to rotate therewith, means for supporting the screw and pointer to rotate but restraining said parts from axial movement, a resilient rod extending transversely of the axis of the screw, fixed at one end, coiled adjacent said end into a helix having its axis transverse to the length of the rod and the axis of the screw, and bent at its other end back parallel to itself to form a slot the width of which is slightly less than the thickness of the screw and through which the screw extends.

5. Indicating mechanism for measuring instruments comprising a quick-thread screw, a pointer secured thereto, bearings in which the screw is mounted to rotate and which restrain it from axial movement, a resilient rod coiled in a helix adjacent one end and bent at its other end, in a plane parallel to the axis of the helix, back parallel to itself to form a slot through which the screw passes without clearance, and means for securing the first said end of the rod to a fixed part with provision for adjustment parallel to the axis of the screw.

6. Indicating mechanism for measuring instruments comprising a pointer, a quick-thread screw secured thereto and mounted to rotate, an L-shaped rod of which one limb is formed with a slot through which the screw passes without clearance, bearings in which the other limb is mounted for axial movement parallel to the axis of the screw and a return spring acting on the rod to move it in one direction.

7. Indicating mechanism for measuring instruments comprising a rotatably mounted pointer, a screw secured thereto and formed by twisting a strip into a helix, a resilient rod bent to form an L and having one limb bent back parallel to itself to form a slot the width of which is not greater than the thickness of the strip, means for supporting the other limb of the rod to move axially and parallel to the axis of the screw with the screw passing through the said slot and a return spring acting on the rod to move it in one direction.

8. Indicating mechanism for measuring instruments comprising a pointer, a screw secured to the pointer, and rotatably mounted, a lever which is formed of a rod coiled into helices with parallel axes at four places and bent at the two inner helices to provide two equal parallel portions joined by a third portion and a second rod bent back on itself to form a slot embracing the screw without clearance and secured at its end to the third portion of the first rod to extend transversely thereof, and means for fixing the ends of the first rod.

9. Indicating mechanism for measuring instruments comprising a rotatable pointer, a screw secured to the pointer to rotate therewith and formed by twisting a flat strip through more than one revolution into a helix, and a resilient rod of which one end is bent back parallel to itself to form a fork embracing the screw and gripping it resiliently, and which is mounted to move in a plane containing the axis of the screw.

10. Indicating mechanism for measuring instruments comprising a rotatable pointer, a quick-thread screw secured to the pointer to rotate therewith, means for supporting the screw and pointer for rotation and for resisting axial movement of the screw, a resilient rod having one end bent back against itself to form a slot through which the screw passes without clearance and so formed as to be flexible adjacent its other end, a bearing wherein the latter end of the rod is mounted for movement in the direction of the length of the rod and means for securing the rod in an adjusted position in the bearing.

ALFRED NUTSFORD.